Dec. 27, 1932.　　D. BUCCICONE ET AL　　1,892,327
SHEARS
Filed Dec. 4, 1931　　4 Sheets-Sheet 1

Inventors:
DARIO BUCCICONE and
ROLLAND E. PETERSON.
by Usina & Rauber
their Attorneys.

Dec. 27, 1932. D. BUCCICONE ET AL 1,892,327
SHEARS
Filed Dec. 4, 1931 4 Sheets-Sheet 4

Inventors:
DARIO BUCCICONE and
ROLLAND E. PETERSON.
by Usina & Rauber
their Attorneys.

Patented Dec. 27, 1932

1,892,327

UNITED STATES PATENT OFFICE

DARIO BUCCICONE, OF GARY, AND ROLLAND E. PETERSON, OF AETNA, INDIANA, ASSIGNORS TO AMERICAN SHEET AND TIN PLATE COMPANY, A CORPORATION OF NEW JERSEY

SHEARS

Application filed December 4, 1931. Serial No. 579,080.

This invention relates to shears, and more particularly to shears of the cross-cut type for cutting up or cross-shearing sheets, packs of tin plate and the like, and has for its object the provision of an improved shear of this type which will automatically shear the material with greater speed and accuracy than the shears of the prior art.

The shear of this invention is adapted primarily for use in connection with a parallel side cutting shear of any well known construction. However, it may be used independently or in connection with any other apparatus providing the material to be cut up has been previously sheared or otherwise worked to provide straight parallel sides in the direction of travel.

In the drawings:

Figure 6 is a plan of the material to be sheared by the apparatus of this invention.

Figure 1:
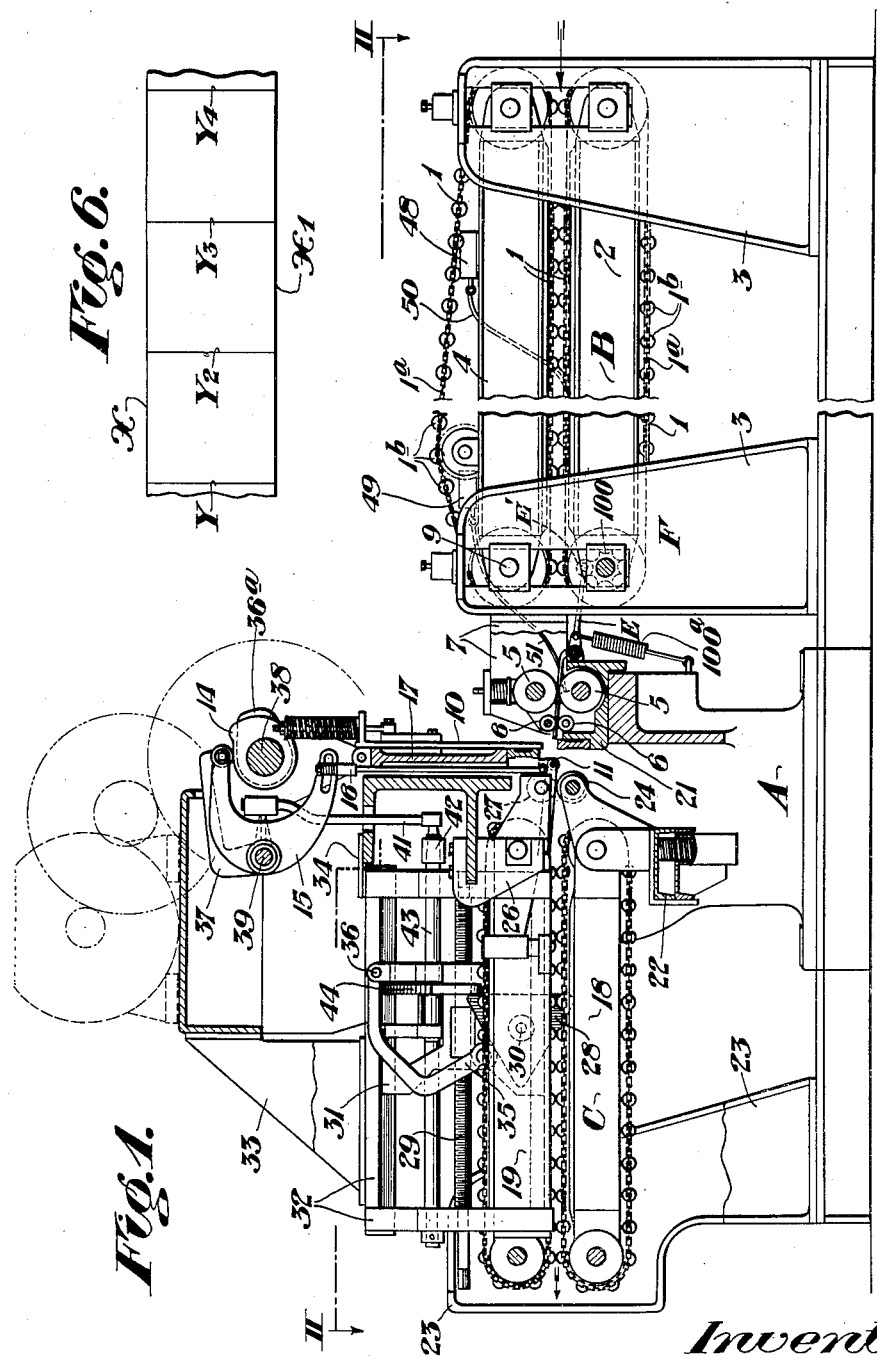
Figure 1 is a side elevation, partly in section, of a shear constructed in accordance with this invention.
Figure 2:
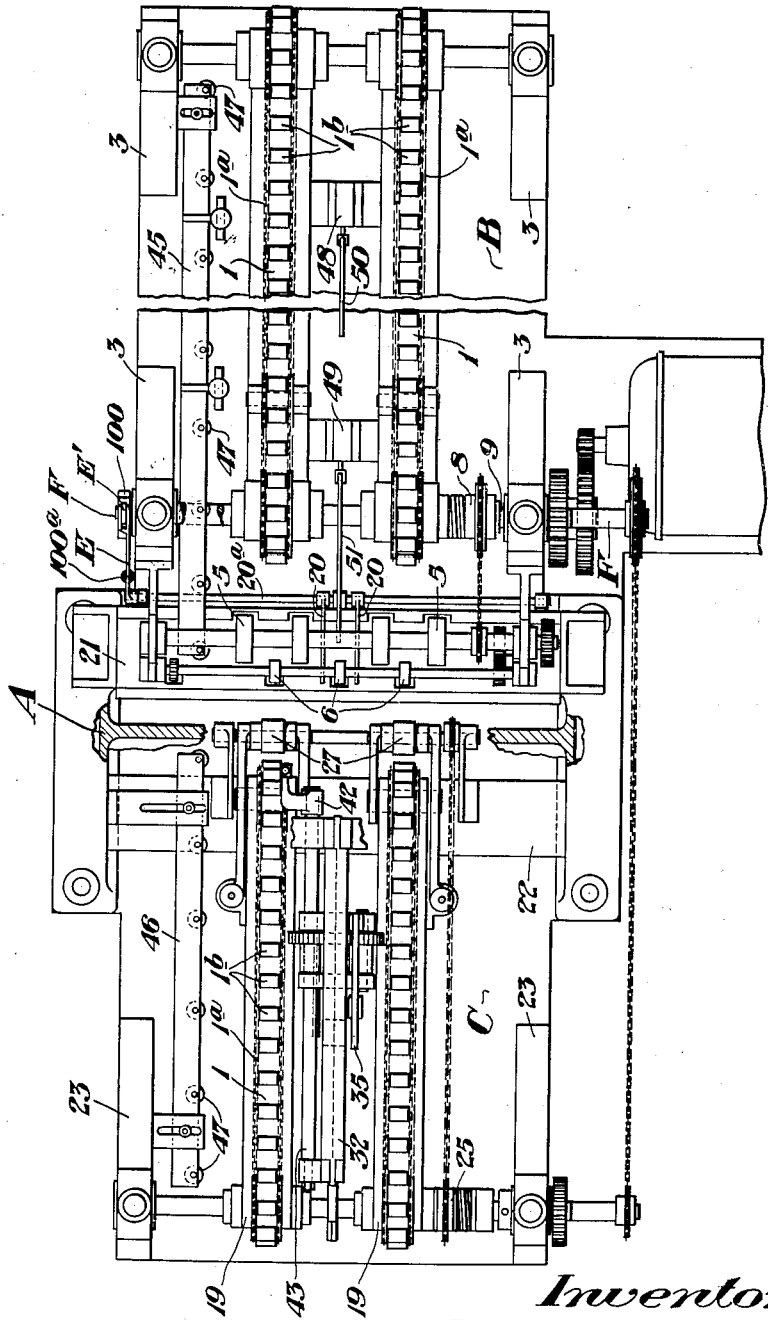
Figure 2 is a sectional plan view taken on the line II—II of Figure 1.
Figure 3:
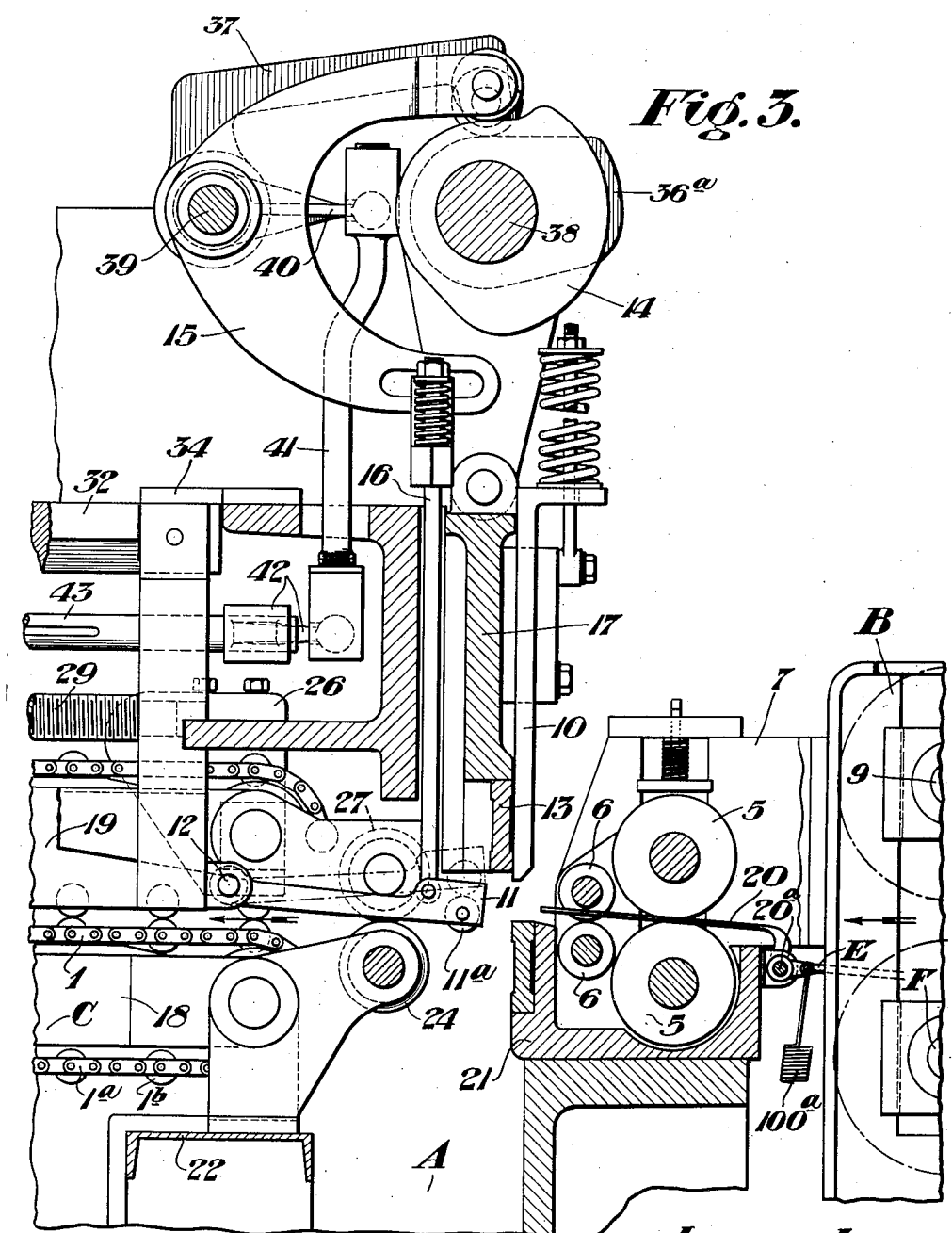
Figure 3 is an enlarged sectional side elevation through the shear portion of the apparatus.
Figure 4:
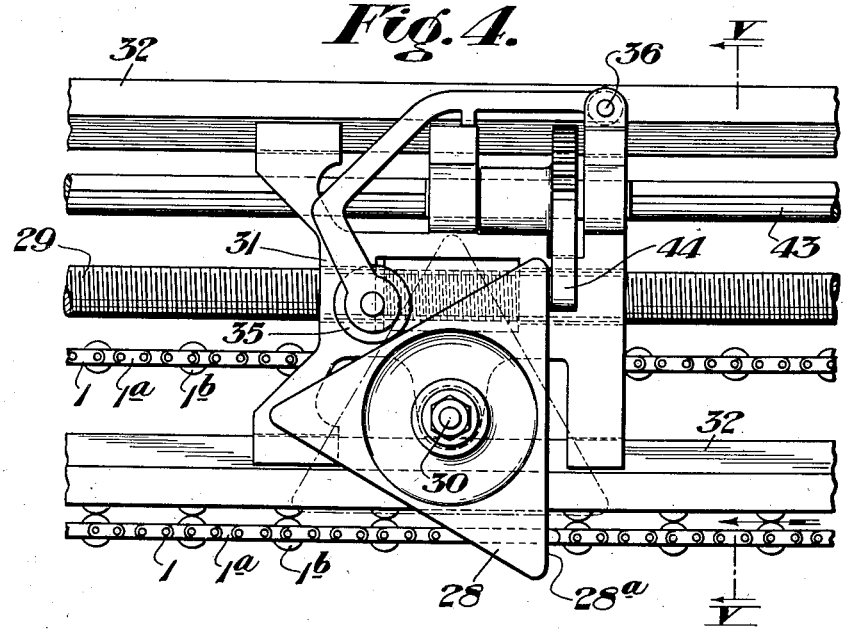
Figure 4 is an enlarged fragmentary sectional side elevation through the discharge conveyer, showing the gage stop mechanism.
Figure 5:
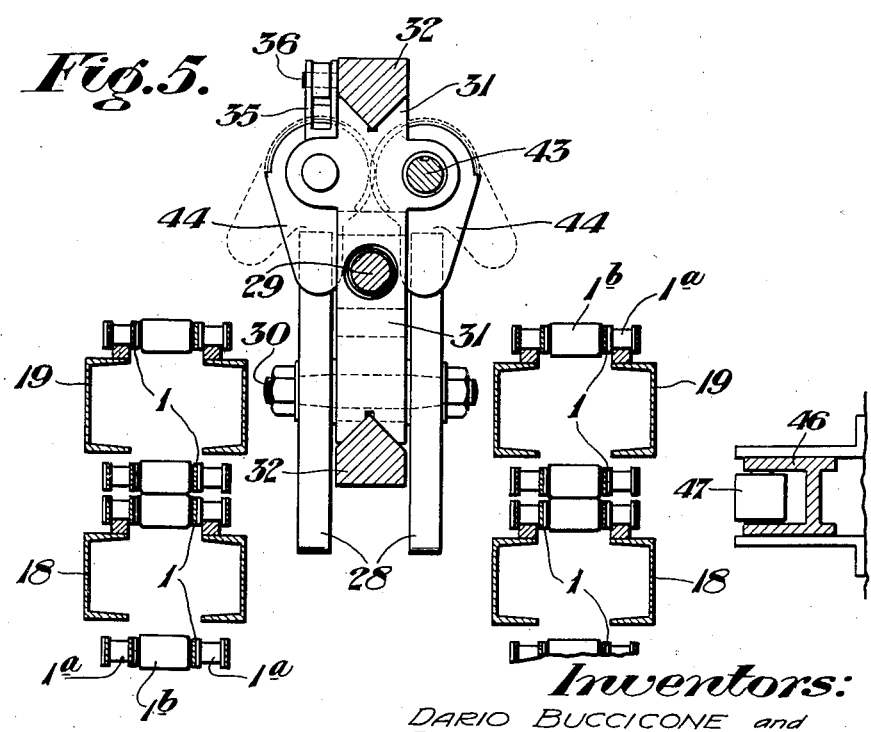
Figure 5 is a transverse sectional elevation taken on the line V—V of Figure 4.

Referring more particularly to the drawings, the letter A designates a cross-cut shear having sheet conveying means B at its entering side and a second sheet conveying means C at its discharge side. The sheet conveying means B comprises a frame 2 supported in housings 3 and two parallel conveying chains 1, and a spring mounted frame 4 which carries two additional chains 1 which are positioned directly above the two parallel chains 1 in the frame 2, thus forming a pinch-type conveyer. The housings 3 support suitably mounted shafts, sprockets and drive arrangements for causing the chains 1 to convey the sheet or pack toward the shear knife 13 of the shear A.

The chains mentioned above are each composed of two strands of steel roller chain $1^a$ between which are floating or idler rollers $1^b$. The rollers $1^b$ are supported by pins, the outer ends of which serve as rivets for the roller chains. The rollers $1^b$ are mounted in such a manner as to allow them to rotate freely in either direction or to remain stationary with reference to their supporting pins, so as to form truly floating or idler rollers, as mentioned above. This chain differs from the automatic conveyer chain in that a sheet, pack or other work being conveyed between two sets of these chains can be stopped at will, while the chain itself moves forward continuously. When the work is being conveyed forward the rollers $1^b$ do not rotate. However, when the work is stopped and the chains 1 continue to move forward the rollers $1^b$ rotate on their pins so as to form a rolling contact with the work and prevent marring of its surface.

A plurality of disks 5 and 6 are arranged forward of the conveyer B at the entering side of the shear A. The disks 5 and 6 are mounted on two bottom and two top shafts, which are carried in a housing 7. The disks 5 and 6 are friction driven so as to convey the sheet or pack in the same direction as the chains 1 of the conveyer B by a clutch 8 mounted on a shaft 9. These friction driven disks 5 and 6 convey the pack or sheet forward as do the chains 1, and when the sheet or pack is stopped the friction clutch 8 slips and disks 5 and 6 cease to rotate but, because of the frictional torque of their drive, tend to hold the sheet or pack against the shear stopping device, to be described.

A spring mounted hold-down member 10 of conventional design is provided on the shear knife head 17 to hold down the work during the shearing operation.

As stated before, this shear is primarily designed for cross-cutting sheets or packs of tin plate, and in Figure 6 is shown a diagram of a sheet or pack such as this apparatus is primarily designed to shear. When entering into the shear the sides X and XI are straight and parallel, due to prior side shearing, and the shear is designed to cut the material into several pieces along the lines Y, $Y^2$, Y³ and Y⁴, which must be at right angles to the sides X and XI and spaced accurately with relation to each other. The forward end of the pack or sheet as the work moves through the shear is described as the curl end and the back or rear end as the tail end.

A forward or curl-end stop 11 is pivoted about a shaft 12 and is normally in the down position when the upper shear knife 13 is at the top of its stroke, and remains in the down position while the shear knife 13 is moved downward to shear the work. As the shear knife 13 and the shear head start to raise, curl-end stop 11 is raised out of the way so as to clear the work by means of a cam 14 mounted on the shear drive shaft 38 through a lever 15 and connecting-rod 16.

A path is thus cleared for the sheet or pack or other work to pass beneath the curl-end stop 11 for the following cut. The cam 14 and follower lever 15 are so arranged that the curl-end stop must move upwardly on the upward stroke of the shear knife 13 and lower again when the knife leaves its highest position. Should there be an obstruction in the path of the stop 11, such as a sheet or pack lying beneath the stop, the stop will descend onto the obstruction and a roller 11ª is provided on the stop to ride on the obstruction and prevent scratching and marring of the work.

A pair of vibrating fingers 20 is mounted on the bed plate 21, and extends between disks 5 and 6 as close as possible to the shear knives. These vibrating fingers 20 serve to tilt the tail end or scrap of the sheet or pack so that it will fall down out of the way. The vibrating fingers 20 are pivoted on a shaft 20ª on which an arm E is keyed. A roller E¹ is mounted on the arm E and is engaged by a notched wheel 100 located at the outer end of a shaft F, which shaft carries the lower disks 5. The roller E¹ and notched wheel 100 are held in engagement by a spring 100ª. As the shaft F is revolved the notched wheel 100 imparts a rapid, reciprocating motion to the arm E and shaft 20ª so as to impart a vibrating motion to the fingers 20.

To the rear of the discharge side of the shear knives the conveyer C is provided, and comprises a frame 18 mounted at the shear end on a channel support 22 and at the discharge end in housings 23. The frame 18 carries at its shear end a plurality of disks 24, which disks are driven by friction clutch 25. A plurality of disks 27 are mounted directly over the disks 24 and are spring pressed so as to cause the pressure between the disks 24 and 27 to give a pinch-roll effect and aid in conveying the sheet or pack forward. When the sheet or pack is stopped the friction clutch 25 slips and the disks 24 and 27 remain stationary, but with a constant frictional torque tending to advance the sheet or pack.

The frame 18 also carries two parallel chains 1, such as described above. A frame 19 supported at the shear end by brackets 26 and at the discharge end by the housings 23 also carries two parallel chains 1 mounted directly above the chains 1 carried by the frame 18, thus forming a pinch-type conveyer similar to the conveyer B previously described, and this conveyer assists in pulling the sheet or packs between the shear knives. It also serves as a discharge conveyer for the sheared portion of the sheet or pack.

The triangular stop 28, adjustable by means of a screw 29 and nut bracket 31 toward or away from the shear plates, is provided to automatically stop the sheet or pack for shearing to the proper length and then to release and allow further forward motion of the sheet or pack preparatory to the following cut. The triangular stop 28, together with its operating mechanism, is carried in a frame work 32 which is attached to the shear by brackets 33 and 34. The triangular stop 28 may be rotated about a shaft 30 which is mounted in the nut bracket 31. A roller counterweight 35 is pivoted on a pin 36 also mounted on the nut bracket 31, and maintains a downward pressure against the triangular stop 28 and causes the forward face, indicated as 28ª of the triangular stop 28, to assume a vertical position with the upper end of the forward face, and said forward face is held against a catch or latch member 44. A cam 36ª is keyed to the shaft 38 and on every revolution of the shaft 38 raises a lever 37 and rotates the shaft 39, which in turn raises a lever 40, connecting-rod 41 and a lever 42. The lever 42 rotates the shaft 43 on which is mounted the catch 44, moving the catch 44 out of the rotating path of the triangular stop 28. When the sheet or pack comes against the triangular stop 28 the sheet or pack is stopped until, by action of the cam 36, the catch 44 is normally moved out of the way.

The rear conveyer chains 1, which are applying a continual torque to the work, then move the work sheet or pack forward and the forward end of the sheet or pack rotates the triangular stop 28 in a clockwise direction so that the face 28ª which was formerly in a vertical position, assumes a horizontal position, and said stop is kept from further rotation by the sheared section of the sheet or pack passing beneath it. As soon as the sheared section of the sheet or pack is clear of the triangular stop 28 the counter-weight roller 35 forces the stop around on its shaft so that it assumes a vertical position and is engaged against the catch or latch 44, which has been returned to its normal position by the cam 36.

The conveyer B and the disks 5 and 6 operate at a lesser speed than the conveyer C so that the unsheared portion of the work will feed forwardly at a lesser rate than the sheared portion to insure a gap between the sheared and unsheared portions of the work, in order to permit the triangular stop 28 to move into its operative position. This gap is further lengthened due to the fact that the sheared portion of the work will move forwardly ahead of the unsheared portion, since the conveyer C is applying a constant torque to the work and will move the sheared section prior to the clearing of the upper shear knife from in front of the unsheared section of work.

Side guides 45 and 46 are provided along one side of the apparatus and carry a multiple of hard rollers 47. These guides are maintained in the housings 3 and 23, respectively. The guides are in line with each other, and are set at an angle of exactly 90° with the shear knives. The conveyer chains 1 carried in the frames 2, 4, 18 and 19 are all mounted at a slight angle to the side guides with the center lines of the chains 1 approaching closer to the side guides toward the rear or discharge end of the apparatus.

The angular action of the chains 1 tends to crowd the sheet or pack against the side guides continuously while the sheet or pack is passing through the shear so as to aline the sheet or pack with the side guides and insure the shear cutting exactly at right angles to the straight side of the sheet or pack crowded against the side guides.

Two limit switches 48 and 49, which are connected in a standard manner so that either or both will operate the shear head and shear knife 13, are mounted on the frame 4 and have operating levers 50 and 51, respectively, depending into the path of travel of the sheet or pack moving through the conveyer B. The switch 48 and lever 50 operate a solenoid (not shown) which trips a clutch (not shown) and operates a shear head. The position or location of the switch 48 is such that a pack or sheet being conveyed forwardly reaches the stop 11 just preceding the downward travel of the shear knife 13, and the switch 49 is located in such a position as to insure operation of the shear until all the cuts on the sheet or pack are made. The cross-cut shear mechanism is of standard commercial construction, and the details of this structure are not shown or described.

In the operation of the apparatus above described a pack or sheet, after having been side sheared, is advanced into the automatic pinch-type conveyer B which, due to the angularity of the chains 1, immediately crowds the pack over against the side rollers 47 of the side guide and causes the pack to travel with its one sheared edge closely in contact with the rollers 47 and, therefore, squared with the shear knife 14. The pack or sheet moves forwardly, due to the constantly moving chains 1, raising the levers 50 of limit switch 48 and 51 of the limit switch 49, and continues into and through the pinch rollers 5 and 6 and finally stops with its forward or curl-end against the curl end stop 11. The rollers 1ᵇ in the chains 1 then roll over the pack or sheet while the chains continue to move and the pack or sheet is held stationary by the curl-end stop 11.

The disks 5 and 6, due to their frictional drive, stop rotating but are constantly pushing on the pack or sheet so as to force the pack or sheet forwardly against the stop 11, with a constant torque. The limit switch 48 being closed by the lever 50 causes the shear head to operate, the location of the shear 48 being such that the lag in the mechanism allows the work to travel up to and against the curl-end stop 11 just as the shear head starts down. The hold-down member 10 precedes the shear knife 15 and holds the pack while it is being sheared. The curl or forward end of the work which is sheared off drops down between the pinch-rollers 24 and the lower knife 13ᵃ to a suitable scrap box. The knife 13 completes its cycle and cam 14 is so timed that the stop 11 raises with the shear head. The action of the roller chains 1 and pinch-roll disks 5 and 6, all of which apply a constant torque to the work-piece during the shearing operation, instantly starts the work forward as soon as the shear knife 13 and curl-end stop 11 are moved upwardly out of the path of travel of the work so as to feed the work into the pinch-roller disks 24 and 27 between the chains 1 in the frames 18 and 19 forming the conveyer C. The pack or work moves forward until it reaches the triangular stop 28, where the newly sheared and squared edge is firmly held against the stop 28 by the action of the chains 1 and disks 24 and 27, which are applying a constant torque to the work. The work is now in position for a second cut.

The distance between the shear knives and the stop 28 is adjustable and may be varied to permit the cutting of different sizes of material.

As the limit switch 49 has been held in by lever 51 the shear continues without pause on its down stroke, again preceded by the member 10. The curl-end stop 11 drops at each stroke of the shear but, due to the fact that the work-piece is under the shear, the stop will drop to the top of the work and rest there while the cut is being made.

As the shear knife 13 starts to raise the curl-end stop 11 raises and the catch 44 is rotated out of the way by a cam 36. The lower conveyer chains 1 of the conveyer rapidly convey the sheared portion of the sheet or pack away from the shear knives and the forward end of the sheared section of the sheet or pack rotates the triangular stop 28 until the stop face 28ᵃ is in a horizontal position. The triangular stop 28 remains in this position until the sheared portion of the sheet or pack passes from beneath it, and the face is then pushed against the catch or latch 44 which has been returned to its normal position by the cam 36. The sheared portion of the sheet or pack is conveyed by the conveyer C onto a suitable packing rack (not shown) and because of the delay of member 10 in releasing the unsheared portion of the sheet or pack and because of the difference in speed of the operation of the conveyers B and C, there is a sufficient gap between the tail end of the sheared portion and the fore end of the remaining part of the work to allow the triangular stop 28 to move into stopping position between the discharge of the sheared portion of the work and in advance of the unsheared portion.

For the final cut the tail end of the pack holds the lever 51 up into operating position so as to keep the switch 49 closed and cause the shear to continue operation. At the completion of the cut the sheared portion is conveyed to the piling rack and the tail end or scrap is pushed off the lower shear knife by the pinch-rolls 5 and 6 and the vibrating fingers 20 into the scrap box or pit.

In case the tail scrap is long enough to span the gap between the pinch-rolls 5 and 6 and 24 and 27, it will be conveyed by pinch-rolls 24 and 27 and chains 1 of the conveyer C to the triangular stop 28.

While this scrap end is between the pinch-rolls 24 and 27 it holds up the limit switch lever 51, causing the shear head 17 to make an extra stroke, and during this extra stroke the triangular stop 28 is released and the scrap end is conveyed by the chains 1 to the finished pile, where the operator may discard it.

The shear knife 13 returns to its normal raised position and stops, with the curl-end stop 11 in its down position in readiness to stop the next pack. As the next pack raises the limit switch levers 50 and 51, the cycle of operations is repeated.

The conveyer chains 1 and the shear knife 13 by which all stop mechanism is operated through the shaft 38 are independently driven by adjustable speed drives of standard form. This permits adjustment of the speed of chains 1 and knife 13 so that the pack may be given sufficient time to reach the triangular stop 28 between the successive cuts.

The control of the cross-cut mechanism of this invention may also be interlocked with a side shear mechanism, so that in case the operation of the cross-cut mechanism is held up for any reason the side shear will not advance other packs or sheets to this cross-cut shearing mechanism and jam or cobble the work.

While we have shown and described in detail a certain embodiment of our invention, we do not wish to be limited thereto, since various modifications may be made without departing from the scope of our invention, as defined by the appended claims.

We claim:

1. A cross-cut shear for shearing multiple length sheets and packs into single lengths comprising a pair of shear knives, means for reciprocating at least one of said knives, means for conveying the work to be sheared into and through the shear, said means including constantly moving continuous conveyer chains arranged one above the other and carrying work-engaging idler rollers which project beyond the chain links and between which the work is pinched, a stop member adapted to be normally in the path of the sheet or pack and to be automatically moved out of the path of the work during the cutting stroke of said movable shear knife to permit the sheared portion of said work to pass thereunder and to be automatically moved down into the path of the work again during the return stroke of said movable shear knife.

2. A cross-cut shear for shearing multiple length sheets and packs into single lengths comprising a pair of shear knives, motor operated means for reciprocating at least one of said knives, means for conveying the work to be sheared into and through the shear, said means including constantly moving continuous conveyer chains arranged one above the other and carrying work-engaging idler rollers which project beyond the chain links and between which the work is pinched, means operable by the work being conveyed toward said shear knives and controlling the operation of said motor operated means, a stop member adapted to be normally in the path of the work during the cutting stroke of said movable shear knife to permit the sheared portion of said work to pass thereunder and to be automatically moved down into the path of the work again during the return stroke of said movable shear knife.

3. A cross-cut shear for shearing multiple length sheets and packs into single lengths, comprising a pair of shear knives, means for reciprocating at least one of said knives, means for conveying the work to be sheared into and through the shear, said means including a constantly moving continuous conveyer, chains arranged one above the other and carrying work-engaging idler rollers which project beyond the chain links and between which the work is pinched, a triangular stop member mounted forward of said shear knives for rotary movement about an axis at right angles to the line of feed of said work through said shear, means for advancing said stop forward and away from said shear knives, means for normally maintaining said stop stationary with one of its sides positioned vertically in the path of work to be sheared, said means being adapted to release said stop during the cutting stroke of said movable shear knife to permit the sheared portion of said work to rotate to said stop and move thereunder and to automatically engage said stop during the return stroke of said movable shear knife to position the next face of said stop in vertical position in readiness to arrest the oncoming unsheared portion of said work.

4. A cross-cut shear for shearing multiple length sheets and packs into single lengths comprising a pair of shear knives, means for reciprocating at least one of said knives, upper and lower conveying means for conveying the work to be sheared into and through the shear, said upper and lower conveying means pinching the work therebetween and tending to constantly feed said work forwardly through said shear, an adjustably positioned stop member adapted to be normally in the path of the work and to be automatically moved out of the path of the work during the cutting stroke of said movable shear knife, a catch member to limit the movement of said stop member, means associated with said shear knife for moving said catch member from engagement with said stop member, and means to automatically move said stop member into the path of the work again during the return stroke of said movable shear knife.

5. A cross-cut shear for shearing multiple length sheets and packs into single lengths comprising a pair of shear knives, means for reciprocating at least one of said knives, conveying means on the upper sides of said knives for conveying the work into and through said shear, each of said conveying means including a constantly moving continuous conveyer, chains arranged one above the other, idler rollers mounted in said chains between which the work is pinched, said conveying means on the entering side of said shear also including pairs of pinch-rollers, yieldable driving means for said pinch-rollers adapted to permit said rollers to remain stationary with a constant driving torque when the work is held stationary, a stop member adjacent said shear knives adapted to move into the path of the curl end of the work to be sheared and to stop said work until said curl end is sheared, means for moving said stop out of the path of the work during the return stroke of said movable shear blade after shearing the curl end of said work, a second stop materially in advance of said first named stop and adapted to gage the length of the piece to be sheared from said work, said last named stop being adapted to be normally in the path of the work and to be automatically moved out of the path of the work during the cutting stroke of said movable shear knife to permit the sheared portion of the work to pass thereunder and to be automatically moved down into the path of work again during the return stroke of said movable shear knife.

6. A cross-cut shear for shearing multiple length sheets and packs into single lengths comprising a pair of shear knives, motor operated means for reciprocating at least one of said shear knives, conveying means on the opposite sides of said shear knives for conveying the work into and through said shear, means operable by the work being conveyed toward said shear knives for controlling the operation of said motor operated means, each of said conveying means including a constantly moving continuous conveyer, chains arranged one above the other, idler rollers mounted in said chains between which the work is pinched, said conveying means on the entering side of said shear also including pairs of pinch-rollers, yieldable driving means for said pinch-rollers adapted to permit said rollers to remain stationary with a constant driving torque when the work is held stationary, a stop member adjacent said shear knives adapted to move into the path of the curl end of the work to be sheared and to stop said work until said curl end is sheared, means for moving said stop out of the path of the work during the return stroke of said movable shear blade after shearing the curl end of said work, a second stop materially in advance of said first named stop and adapted to gage the length of the piece to be sheared from said work, said last named stop being adapted to be normally in the path of the work and to be automatically moved out of the path of the work during the cutting stroke of said movable shear knife to permit the sheared portion of the work to pass thereunder and to be automatically moved down into the path of work again during the return stroke of said movable shear knife.

In testimony whereof, we have hereunto set our hands.

DARIO BUCCICONE.
ROLLAND E. PETERSON.